United States Patent [19]

Sekmakas et al.

[11] Patent Number: 4,518,746
[45] Date of Patent: May 21, 1985

[54] POLYESTER OLIGOMER AND HIGH SOLIDS THERMOSETTING COATINGS

[75] Inventors: Kazys Sekmakas, Palatine; Raj Shah, Schaumburg; Ronald J. Lewarchik, Arlington Heights; Kevin P. Murray, Homewood, all of Ill.

[73] Assignee: DeSoto, Inc., Des Plaines, Ill.

[21] Appl. No.: 589,728

[22] Filed: Mar. 15, 1984

Related U.S. Application Data

[62] Division of Ser. No. 491,391, May 4, 1983, Pat. No. 4,459,401.

[51] Int. Cl.³ ............................................. C08L 61/28
[52] U.S. Cl. .................................. 525/443; 428/458; 428/460; 428/480; 524/594; 524/597; 525/442; 525/508; 525/519
[58] Field of Search ............... 524/594, 597; 525/442, 525/443, 508, 519; 528/296, 302

[56] References Cited

U.S. PATENT DOCUMENTS 3,549,577 12/1970 Stromberg ........................ 524/598
4,088,619  5/1978 Holzrichter ...................... 525/443

Primary Examiner—Theodore E. Pertilla

Attorney, Agent, or Firm—Dressler, Goldsmith, Shore, Sutker & Milnamow

[57] ABSTRACT

An essentially linear polyester oligomer having hydroxyl and carboxyl terminal groups for subsequent cure and its production are disclosed. This polyester oligomer is produced by first adducting approximately equimolar amounts of diol carrying two primary hydroxyl groups and a dicarboxylic acid anhydride to form an hydroxy acid. The carboxyl groups of this hydroxy acid are then esterified by reaction with an approximately stoichiometric proportion of diol carrying one primary hydroxyl group and one secondary hydroxyl group, the stoichiometry being based on the total hydroxyl content of the diol and the carboxyl content of the hydroxy acid, to form an hydroxyl-terminated oligomer. This hydroxyl-terminated oligomer is then adducted with a polycarboxylic acid monoanhydride having a carboxyl functionality of at least 3, this monoanhydride being used in an amount of 0.01 to 0.15 equivalents of anhydride per hydroxyl equivalent in the hydroxyl-terminated oligomer. The resulting polyester oligomer is essentially linear and possesses low solution viscosity at high resin solids content combined with high reactivity enabling low temperature cure with aminoplast resins.

9 Claims, No Drawings

POLYESTER OLIGOMER AND HIGH SOLIDS THERMOSETTING COATINGS

This is a division of application Ser. No. 491,391 filed May 4, 1983, U.S. Pat. No. 4,459,401 issued July 10, 1984.

FIELD OF INVENTION

This invention relates to polyester oligomers and their production and to high solids content organic solvent solution thermosetting coating compositions containing these oligomers.

BACKGROUND ART

Organic solvent solution thermosetting coating compositions containing polyester resins in combination with aminoplast resins are well known, but these normally contain a low proportion of resin solids because the polyester resins commonly used provide excessive solution viscosity when the resin solids content of the system is increased.

One way to minimize the emission of organic volatiles from a coating operation is to increase the resin solids content of the coating solution, thus directly decreasing the amount of volatile organic solvent needed to deposit a given quantity of coating solids. Since this cannot be done with the polyester resins commonly used, an effort has been made to find new polyester resins which will possess reduced solution viscosity enabling an increase in the solids content of the coating.

Another objective in the coating industry is to minimize the baking temperature. The polyester resins commonly used require baking temperatures of about 300° F. and higher, and it is desired to minimize the baking temperature to conserve energy to minimize cost, and to enable the coating of heat-sensitive thermoplastic substrates. When one employs a lower molecular weight polyester in an effort to increase the solids content of the solution coating composition, then a more extensive reaction is needed in order to build the film quality which is needed in the final cured coating. The effort to increase solids content is thus made more difficult by the need to maintain coating performance using minimal baking conditions for cure.

The provision of an appropriate polyester resin to solve the industrial problem outlined above and to thereby enable thermosetting solution coating compositions of the type under consideration possessing increased solids content combined with high reactivity and the capacity to provide cured films of good quality using minimal baking conditions is thus the prime objective of this invention.

DISCLOSURE OF THE INVENTION

In this invention, an essentially linear polyester oligomer having hydroxyl and carboxyl terminal groups is produced by first adducting approximately equimolar amounts of diol carrying two primary hydroxy groups and a dicarboxylic acid anhydride to form an hydroxy acid. The carboxyl groups of this hydroxy acid are then esterified by reaction with an approximately stoichiometric proportion of diol carrying one primary hydroxyl group and one secondary hydroxyl group, the stoichiometry being based on the total hydroxyl content of the diol and the carboxyl content of the hydroxy acid, to form an hydroxyl-terminated oligomer. This hydroxyl-terminated oligomer is then adducted with a polycarboxylic acid monohydride having a carboxyl functionality of at least 3, this monoanhydride being used in an amount of 0.01 to 0.15 equivalents of anhydride per hydroxyl equivalent in the hydroxyl-terminated oligomer.

The resulting polyester oligomer is essentially linear and possesses low solution viscosity at high resin solids content combined with high reactivity enabling a low temperature cure with aminoplast resins. The preferred aminoplast resin is hexamethoxymethyl melamine which is used because of its high functionality and high solubility. Baking temperatures as low as about 230° F. become practicable in this invention, and this enables the practical coating of plastic as well as metal surfaces.

Referring first to the diol component which carries two primary hydroxyl groups, the preferred diol is neopentyl glycol which has the formula:

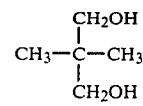

As can be seen, this diol contains a carbon atom in which all four of its functionalities are connected to another carbon atom. This structure provides preferred properties, but other useful diols are illustrated by 1,6-hexane diol and 1,5-pentane diol.

It is desired to point out that when the reactive functional groups of a compound are specified herein, and as is customary in organic chemistry, other unspecified groups are not present. Thus, a diol contains two hydroxy groups and no other reactive group. Also, and throughout this specification and claims, all proportions are by weight, unless otherwise stated.

The dicarboxylic acid anhydride which is adducted with the above described diol is preferably phthalic anhydride. Succinic anhydride or adipic anhydride are also useful.

The anhydride and diol are adducted together in approximately equimolar amounts to form an hydroxy acid. A small (2% to 15%) excess in the molar proportion of diol is desirable to minimize the formation of adduct lacking the hydroxy group.

The reaction between acid anhydride and primary hydroxy is itself well known and requires only moderate heat, as will be illustrated in the Example.

The hydroxy acid which is produced need not be pure and may contain unreacted diol and/or dicarboxylic acid diester. These will be consumed by subsequent esterification reactions.

The carboxyl groups of the hydroxy acid are now esterified with the addition of an approximately stoichiometric proportion of diol carrying one primary hydroxyl group and one secondary hydroxyl group. The stoichiometry is based on the total hydroxyl content of the added diol and the carboxyl content of the hydroxy acid. It will be appreciated that for each carboxyl group in the hydroxy acid, one primary hydroxyl group is also present which can react when the temperature, presence of catalyst, and removal of water favor that reaction. The added diol contributes another 0.5 equivalent of primary hydroxyl and 0.5 equivalent of secondary hydroxyl, so there is present about 1.5 equivalents of primary hydroxyl per equivalent of carboxyl. This large excess of primary hydroxyl, and also the presence of 0.5 equivalent of secondary hydroxyl, limits molecular weight, and the avoidance of larger excesses allows some limited molecular weight increase.

The stoichiometry of the added diol, on the basis stated, should be within ±20%, preferably within ±10%.

The preferred diol carrying one primary hydroxyl group and one secondary hydroxyl group is 2,2,4-trimethyl 1,3-pentanediol which has the structure:

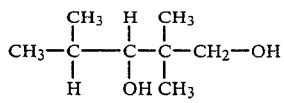

One may also use 1,3-hexane diol, but the presence of a carbon atom joined to four other carbon atoms in the preferred diol again contributes superior properties.

The esterification reaction is, again, a well known reaction which will be illustrated in the Example, and it is continued to an acid number of less than 20, preferably less than 10, to consume almost all of the carboxyl functionality present.

The temperature is then lowered to one which enables adduction, but not esterification, and the polycarboxylic acid monoanhydride is added to allow the adduction to proceed. Dianhydrides should be avoided for these increase viscosity. Dicarboxylic anhydrides are not adequate to provide sufficient carboxyl functionality for subsequent cure unless one uses too much, in which case the hydroxyl functionality is excessively reduced.

Trimellitic anhydride is preferred, and other suitable polycarboxylic acid monoanhydrides are illustrated by glutaric acid anhydride and pyromellitic acid monoanhydride.

While any organic solvent-soluble, heat-hardening aminoplast resin may be used, hexamethoxymethyl melamine is characterized by high functionality, low temperature removal of the blocking methyl ether groups, and high solubility, and is hence preferred. Formaldehyde condensates with urea, benzoguanamine and bisphenol A, will further illustrate the useful aminoplast resin curing agents. High functionality (at least two N-methylol groups or an ether thereof per molecule) is preferred.

The aminoplast resin curing agents are broadly useful in an amount of from 3% to 50%, preferably from 5% to 40%, based on total resin solids.

By high solids is meant a total solids content of at least about 50%, preferably at least about 60%. As will be seen in the Example, coating solutions with total solids content well above 60% can be provided.

The solvents used are the common ones for this type of solution coating. Aromatic solvents, like xylol, either alone or in admixture with alcohols, like butanol, are preferred. Especially preferred solvent systems for use herein include an aromatic hydrocarbon together with at least 25% of a ketone solvent, like methyl amyl ketone, and at least 10% of an alcoholic solvent, like butanol or diacetone alcohol, based on total solvent.

Throughout this application and in the claims which follow, all parts and proportions are by weight, unless otherwise specified.

EXAMPLE 1

900 grams of neopentyl glycol and 1232 grams of phathalic anhydride are charged to a reactor equipped with an agitator, a reflux condenser, and a trap enabling the removal of water of reaction (when this becomes necessary). The mixture is then slowly heated (1½ hour heat up time) to 150° C., agitation being started as soon as possible. The reactor contents form a hot melt which is sparged with nitrogen at 1 cubic foot per minute and held at 150° C. for 1½ hours after this temperature is reached.

From the standpoint of stoichiometry, a slight molar excess of glycol has been used to insure that all of the anhydride groups of the phthalic anhydride are consumed in the adduction reaction which produces an hydroxy acid.

1216 grams of 2,2,4-trimethyl 1,3-pentanediol are added to the reaction mixture at 150° C. along with 6.5 grams of dibutyl tin oxide esterification catalyst, and 78 grams of xylol are used to set the trap. The mixture is then heated to 185° C. and held for one hour at that temperature. Then heat is applied to increase the temperature to 210° C. while collecting water in the trap. The esterification reaction is continued until a withdrawn specimen shows an acid value of less than 6.

The temperature is now lowered to 180° C. and 130 grams of trimellitic anhydride are added and the mixture is held at 180° C. for 1 hour to consume all of the anhydride functionality. Cooling is then started and 350 grams of xylol are added to provide a solution which is cooled to room temperature. 50 grams of xylol are then added to adjust the viscosity to $Z_5$ on the Gardner scale. The product had a solids content of 89.1% and an acid value (on nonvolatile solids) of 19.1.

EXAMPLE 2

47.0 parts of the polyester solution of Example 1 are combined with 18.0 parts of hexamethoxymethyl melamine, 0.5 part p-toluene sulfonic acid solution (40% active, such as the American Cyanamid product Cycat 4040), 20.0 parts of methyl amyl ketone and 14.5 parts of n-butanol. These components are combined by simple stirring. The resulting thermosetting coating solution is applied to polyester, aluminum and steel substrates by air spray to provide a coating having a thickness, after curing, of 0.75 to 1.0 mil. The cure was obtained by placing the coated substrates in an oven maintained at 280° F. for 30 minutes. The cured coatings were adherent to the substrates tested, they were flexible and had about a 2H pencil hardness.

EXAMPLE 3

54 parts of the polyester solution of Example 1 are combined with 25 parts of a butylated urea-formaldehyde condensate (Beetle 80 from American Cyanamid may be used) and catalyzed with 1.00 part of the p-toluene sulfonic acid solution used in Example 2. 10.0 parts of xylol and 5.0 parts of isopropanol are added to enable air spray, as in Example 2. Coating and baking as in Example 2 provides corresponding results.

EXAMPLE 4

68 parts of the polyester solution of Example 1 are combined with 25 parts of a benzoguanamine-formaldehyde condensate (Cymel 1123 from American Cyanamid may be used) and catalyzed with 1.25 parts of dinonyl naphthalene disulfonic acid solution. 5.75 parts of diacetone alcohol are used to provide air spray viscosity. Coating and baking at 325° F. for 20 minutes gives corresponding results to those obtained in Example 2.

EXAMPLE 5

49 parts of the polyester solution of Example 1 are combined with 30 parts of a heat-reactive phenolic resin (CK 1634 from Union Carbide may be used), 10.0 parts of diacetone alcohol, 10 parts of xylol and 1.0 part of butyl acid phosphate. Coating and baking as in Example 4 provides corresponding results.

EXAMPLE 6

54 parts of the polyester solution of Example 1 are combined with 35 parts of a partially etherified melamine-formaldehyde condensate (Cymel 370 from American Cyanamid may be used) 6.0 parts of 2-ethoxy ethanol acetate, 4.0 parts of n-butanol and 1.0 part of butyl acid phosphate. Coating and baking as in Example 2 provides corresponding results.

EXAMPLE 7

45 parts of the polyester solution of Example 1 are combined with 15.0 parts of aluminum silicate, 3.0 parts of titanium dioxide, rutile, and 5.0 parts of black iron oxide. This mixture is then milled to a North Standard grind rating of 6.5. There is then added 20.0 parts of hexamethoxymethyl melamine, 1.5 parts of p-toluene sulfonic acid, 3.0 parts of n-butanol and 7.5 parts of xylol. Coating and baking as in Example 2 provides corresponding results.

EXAMPLE 8

40 parts of the polyester solution of Example 1 are combined with 10.0 parts of barium sulfate and 10.0 parts of red iron oxide, and the mixture is milled to a North Standard grind rating of 6.0. There is then added 20.0 of the partially etherified melamine-formaldehyde used in Example 6, 1.0 part of butyl acid phosphate, 5.0 parts of n-butanol, 7.0 parts of diacetone alcohol and 7.0 parts of methyl isobutyl ketone. Coating and baking as in Example 2 provides corresponding results.

EXAMPLE 9

54 parts of the polyester solution of Example 1 are combined with 32 parts of hexamethoxymethyl melamine, 0.75 part of p-toluenesulfonic acid, 5.0 parts of n-butanol 7.75 parts of xylol and 0.5 part of morpholine. Coating and baking as in Example 2 provides corresponding results.

It is desired to stress that lower curing temperature generally requires greater amounts of catalysts. The examples which have been presented are catalyzed to provide a good cure in the range of 250° F. to 280° F. with the exception of those which use phenolic and benzoguanamine curing agents which are cured with a different curing cycle, namely: 325° F. for 20 minutes.

What is claimed is:

1. A thermosetting organic solvent solution coating composition containing at least about 50% of total solids and comprising volatile organic solvent having dissolved therein an essentially linear polyester oligomer having hydroxyl and carboxyl terminal groups for subsequent cure and formed by adducting approximately equimolar amounts of diol carrying two primary hydroxyl groups and a dicarboxylic acid anhydride to form an hydroxy acid, esterifying the carboxyl groups of said hydroxy acid by reaction with an approximately stoichiometric proportion of diol carrying one primary hydroxyl group and one secondary hydroxyl group, the stoichiometry being based on the total hydroxyl content of the diol and the carboxyl content of the hydroxy acid, to form an hydroxyl-terminated oligomer, and then adducting said hydroxyl-terminated oligomer with a polycarboxylic acid monoanhydride having a carboxyl functionality of at least 3, said monoanhydride being used in an amount of 0.01 to 0.15 equivalents of anhydride per hydroxyl equivalent in said hydroxyl-terminated oligomer, whereby the polyester oligomer so-produced is essentially linear and possesses low solution viscosity at high resin solids content, and from 3% to 50% of total resin solids of an amino-plast resin or phenoplast resin curing agent.

2. A thermosetting solution coating composition as recited in claim 1 in which said organic solvent comprises aromatic hydrocarbon in admixture with an alcohol and a ketone.

3. A thermosetting solution coating composition as recited in claim 2 in which said curing agent is an aminoplast resin.

4. A thermosetting solution coating composition as recited in claim 1 in which said diol carrying two primary hydroxyl groups is neopentyl glycol, and the diol carrying one primary hydroxyl group and one secondary hydroxyl group is 2,2,4-trimethyl 1,3-pentanediol.

5. A thermosetting solution coating composition as recited in claim 4 in which said dicarboxylic acid monoanhydride is phthalic anhydride.

6. A thermosetting solution coating composition as recited in claim 4 in which said polycarboxylic acid monoanhydride is trimellitic anhydride.

7. A thermosetting solution coating composition as recited in claim 5 in which said polycarboxylic acid monoanhydride is trimellitic anhydride and a 2% to 15% excess in the molar proportion of diol containing two primary hydroxy groups is used.

8. A thermosetting organic solvent solution coating composition containing at least about 60% of total solids and comprising volatile organic solvent having dissolved therein the polyester oligomer of claim 7 and from 5% to 40% of resin solids of hexamethoxymethyl melamine.

9. A thermosetting solution coating composition as recited in claim 8 in which said organic solvent comprises aromatic hydrocarbon in admixture with at least 25% of a ketone and at least 10% of an alcoholic solvent, based on total solvent.

* * * * *